Oct. 20, 1953  J. C. GILL  2,655,965
EGG BREAKING MACHINE
Filed July 10, 1952  5 Sheets-Sheet 1

Fig. 1.

INVENTOR.
JAMES C. GILL,
BY: Harold B. Hood.
ATTORNEY.

INVENTOR.
JAMES C. GILL,
BY: Harold B. Hood
ATTORNEY.

Oct. 20, 1953     J. C. GILL     2,655,965
EGG BREAKING MACHINE
Filed July 10, 1952     5 Sheets-Sheet 4

INVENTOR.
JAMES C. GILL,
BY: Harold B. Hood
ATTORNEY.

Patented Oct. 20, 1953

2,655,965

UNITED STATES PATENT OFFICE 2,655,965

EGG BREAKING MACHINE

James C. Gill, Indianapolis, Ind.

Application July 10, 1952, Serial No. 298,082

12 Claims. (Cl. 146—2)

The present invention relates to improvements in egg breaking machines, and its primary object is to improve the overall operation of machines of the character indicated. To that end, I have modified several features of previously known machines for accomplishing the general function of egg breaking, and have added certain new features, all of such features cooperating, among themselves and with the unmodified parts of previously known machines to accomplish the intended objective of improving the speed and efficiency with which eggs, in quantity, can be broken for use, while minimizing losses, contamination of the finished product, and the like.

In egg breaking machines heretofore known, the actual fracturing and opening of an egg shell, to accomplish discharge of the meat to suitable separating and/or collecting devices, is preferably accomplished by a device of the character disclosed in Patent 2,314,741 issued to L. M. Sigler on March 23, 1943. It is essential to the optimum operation of such a device that the egg upon which the device is acting shall be, in the first instance, bodily held against any movement in the direction in which the opening device applies force to penetrate the shell; and shall be held against dislodgment, while the shell ends are left free to pivot away from a median transfer plane, while the opening device applies separating forces to those shell ends. Hold-down devices heretofore used in connection with the mechanism of the above-mentioned Sigler patent have been unsatisfactory in several respects; and an object of the present invention is to provide novel, automatically acting hold-down means for accomplishing the above-stated functions.

In conventional machines of the character here under consideration, eggs are delivered successively to the machine and then, through the medium of indexing advancing means, the eggs are advanced, from the point of reception to the point at which the opening device acts. Some operational difficulties have been experienced with the known advancing devices; and a further object of the present invention is to improve such advancing mechanism.

In order that indexing advancing means of the character above-mentioned shall operate satisfactorily, it is essential to provide some sort of means whereby eggs, as they are delivered to the machine, will be properly oriented with respect to the advancing means; and a still further object of the present invention is to improve the orienting means heretofore used in connection with such machines.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

One conventional form of egg breaking machines, known prior to my invention, is disclosed in the patent to L. M. Sigler, No. 2,229,349 issued January 21, 1941. The driving mechanism of my invention selected for illustration herein is closely similar to that disclosed in the said Patent No. 2,229,349; and therefore the specific shapes of the various actuating cams have not been illustrated, but instead, the operation of the cam actuating driving linkages will be described in detail, it being understood that those linkages are driven, in turn, in a manner closely corresponding to the disclosure of the said Patent No. 2,229,349.

In the drawings forming a part of the present disclosure, I have illustrated a machine comprising a main frame 11 upon which is fixedly mounted egg-supporting means comprising a series of seats 12, equally spaced longitudinally of the machine. In these drawings, I have illustrated only one such series, though it is conventional to provide four or more series of such seats and their associated parts to be described. It will be understood, then, that the mechanism to be described herein may be repeated, in a commercial machine coming within the scope of the present invention, any reasonable number of times, the several duplicate mechanisms being arranged in side-by-side relation, transversely of the frame 11. Only one such mechanism is illustrated and described, in order to avoid complication of the present disclosure.

Orienting means, indicated generally by the reference numeral 13, is arranged at the entrance of the machine; and egg-opening means, indicated generally by the reference numeral 14, is arranged at the exit end of the machine. Eggs are delivered serially to the orienting means 13 by an endless-traveling-bar type conveyor 15.

Figure 1:
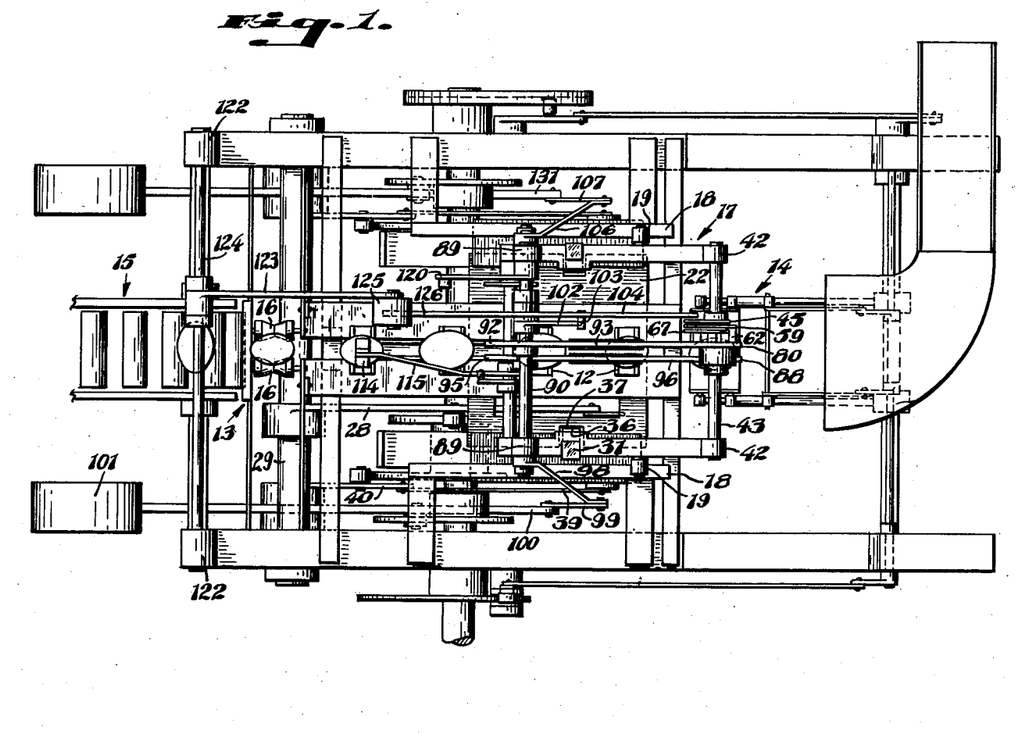
Fig. 1 is a plan view, more or less diagrammatic, of an egg breaking machine embodying the improvements contemplated by the present invention.

The orienting means includes, for each of the mechanisms to be described herein, a pair of diabolo or hour-glass shaped rolls 16 arranged on spaced, parallel axes extending in the direction of the indexing means, later to be described. As is clearly to be seen in Fig. 1, eggs are carried on the conveyor 15 with their long axes substantially transverse to the direction of travel. Means (not shown) is provided for spinning the rolls 16 in the manner fully described in my prior Patent 2,598,905 issued June 3, 1952, so that, when an egg is deposited upon the roll pair, the action of the rolls tends to turn the egg into a position in which its long axis is arranged in the direction of egg travel. While the device, as thus far described, works reasonably well to align the eggs in the desired position of orientation, I have found that occasionally an unusually large egg, and sometimes an unusually small egg, will fail to attain proper orientation before the indexing rack engages the egg to lift it from the rolls 16, with the result that such an egg may be dropped by the rack; therefore I have provided additional means, later to be described, to insure accurate orientation of each egg as it is lifted from the rolls 16, and maintenance of that orientation as the egg is deposited in the first of the seats 12.

Figures 7, 8, 9, 10:
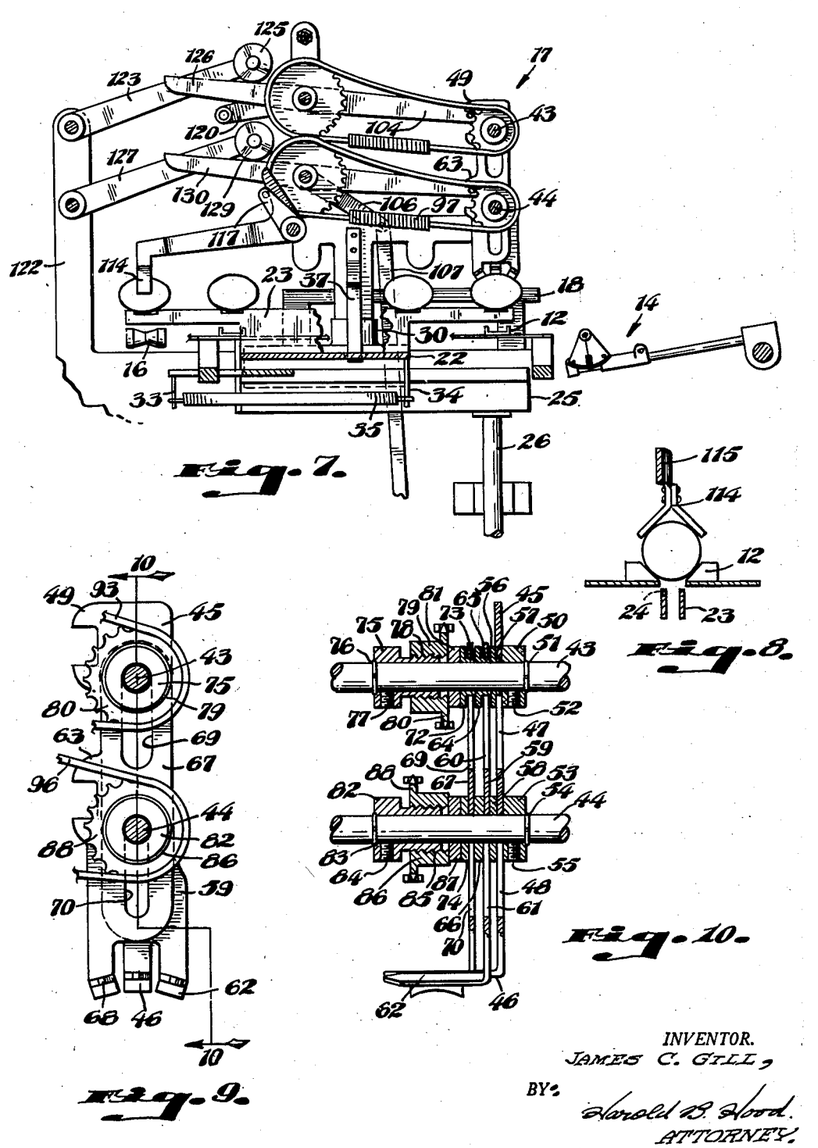
Fig. 8 is a fragmental section, taken substantially on the line 8—8 of Fig. 2, and drawn to an enlarged scale.
Fig. 9 is an enlarged elevation of the hold-down mechanism of the present invention.
Fig. 10 is a section taken substantially on the line 10—10 of Fig. 9.

A mechanism-supporting carriage is indicated at 17 and is supported, for reciprocation in the direction of egg movement, by rollers 19 bearing upon trackways 18 fixedly supported on the frame 11. A block 20 (Fig. 4), formed to provide a longitudinally extending trackway 21, slidably supports a plate 22 which, in turn, supports a rack 23 formed with a series of seats 24, said seats being spaced apart, in the direction of egg movement, by a distance equal to the distance between seats 12. Fig. 8 illustrates the fact that the rack 23 comprises transversely spaced bars in which are formed the seats 24, whereby the rack is capable of picking up and supporting eggs arranged on the seats 12.

Figure 2:
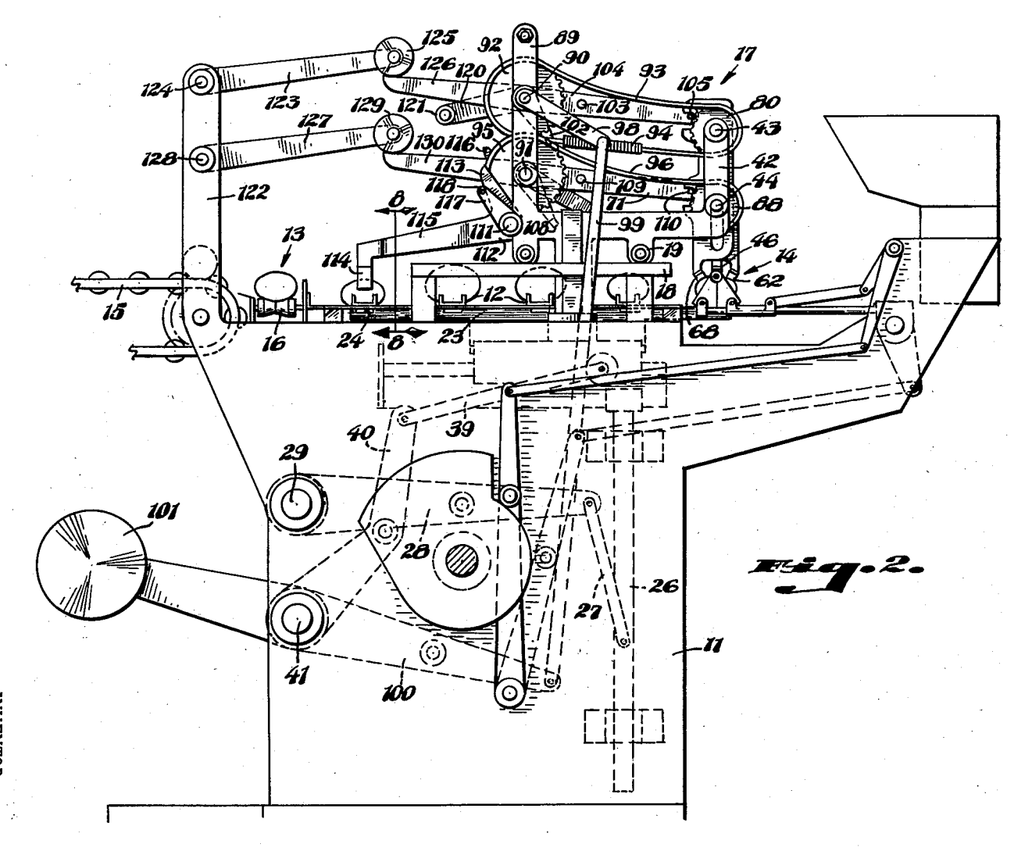
Fig. 2 is a side elevation thereof.

The block 20 is, in turn, mounted for slidable reciprocation upon a platform 25 which, in its turn, is carried by a post 26 guided for substantially vertical reciprocation in the frame 11 (Fig. 2). A link 27 provides a driving connection to said post 26 from a lever arm 28 mounted for oscillation about the axis of a trunnion member 29 transversely arranged in the frame 11; and suitable cam means will control oscillation of said lever and consequent reciprocation of the post 26 in the manner hereinafter to be described.

Figure 6:
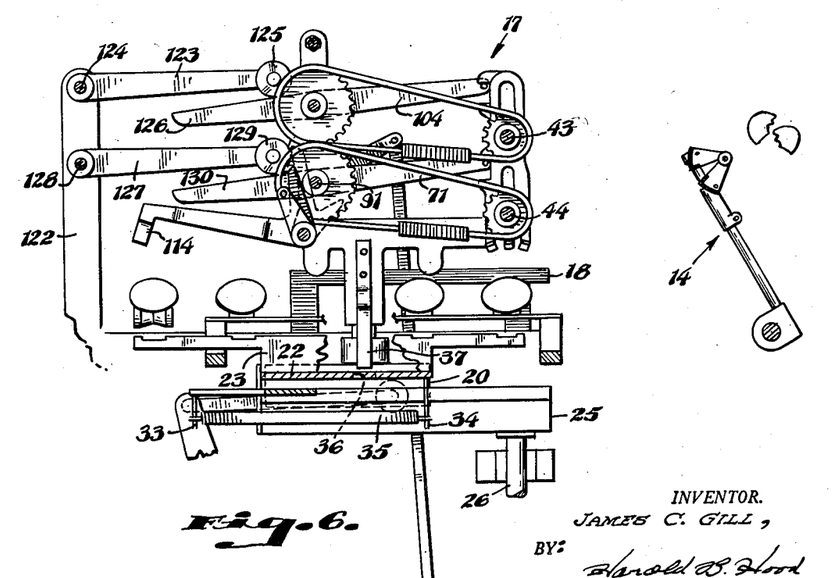

An upstanding boss 30 (Fig. 4) on the block 20 fixedly supports a column 31 which is vertically slidably received in a socket 32 formed in the carriage 17. A pin 33 fixed with respect to the block 20, and a pin 34 fixed with respect to the plate 22 constitute anchorages for opposite ends of a coiled spring 35 which tends resiliently to urge the plate 22 toward the left (as viewed in Fig. 4) with respect to the block 20. Said plate 22 is formed with a notch or socket 36 (Figs. 1, 3 and 6) in which is received, at times, the lower end of a finger 37 carried by the carriage 17, for a reason which will appear.

Pivotally connected to the block 20 at 38 (Figs. 4 and 5) is a link 39 connected, at its opposite end, to a lever 40 (Figs. 2, 3 and 4) mounted for oscillation about the axis of a trunnion element 41 substantially parallel to the trunnion element 29, said lever being oscillated, by suitable cam means, to reciprocate the block 20 in the manner hereinafter to be described.

A pair of supports 42, 42 (Figs. 1 and 2) mount two trunnion elements 43 and 44 upon substantially parallel, vertically spaced axes, as clearly illustrated in Figs. 2, 9 and 10. A presser element 45 comprises a plate, strap or slide, having a foot or toe 46 turned substantially at right angles to the body of the plate. The plate 45 is vertically slotted and in the illustrated embodiment of the invention, the slotting of the member 45 includes an upper slot 47 and a lower slot 48, said slots being dimensioned, respectively, to pass the trunnion elements 43 and 44, whereby the presser member is supported and guided for vertical reciprocation relative to said trunnion elements. A finger 49 adjacent the upper end of member 45 projects toward the receiving end of the machine for a reason which will later appear.

An abutment member 50 is mounted on the trunnion element 43 and is held against axial movement relative to said trunnion element by a snap ring 51 and/or a set screw 52. A similar abutment member 53 is mounted on the trunnion element 44 and is held against axial movement with respect thereto by a snap ring 54 and/or a set screw 55, elements 50 and 53 presenting, in the illustrated embodiment of the invention, forwardly facing surfaces disposed in a common vertical plane perpendicular to the axes of the trunnion elements 43 and 4. A spacer element 56, formed with a hub portion 57, is mounted on the trunnion element 43 and is formed to provide a surface frictionally engageable with the forward face of the presser member 45. The hub 57 enters the slot 47; but its axial length is less than the thickness of the member 45 so that, when a force is applied to the member 56, in the direction of the abutment member 50, the presser member 45 will be clamped between the spacer 56 and the abutment member 50, and thus will be held against movement relative to the trunnion element 43.

A simple, discoid spacer member 58 is sleeved on the trunion element 44 for frictional engagement with the forward face of the presser member 45 so that, when force is applied to the element 58 in the direction of the abutment member 53, the presser member 45 will be similarly braked thereby against movement relative to the trunnion element 44.

A second presser element 59 is formed with slots 60 and 61 similar to the slots 47 and 48 of the presser member 45, and said member 59 is formed with a forwardly projecting toe 62 which, as is most clearly illustrated in Fig. 9, is located on the righthand side of the toe 46 and is slightly tilted from the horizontal. A finger 63 (Figs. 3, 4 and 9) is located adjacent the upper end of the member 59 and projects toward the entrance end of the machine for a purpose which will appear hereinafter.

A spacer member 64 is sleeved on the trunnion element 43 and is formed with a hub portion 65 which enters and penetrates the slot 60, the axial length of said hub portion 65 exceeding the thickness of the presser member 59. A simple, discoid spacer member 66 is sleeved on the trunnion element 44 for frictional engagement with the forward face of the presser member 59. It will be apparent, from an examination of Fig. 10, that, while force applied to the spacer member 66 in the direction of the abutment member 53 will result in the application of a braking force to the presser members 59 and 45, pressure applied to the spacer 64 in a corresponding direction will result in the application of a braking force to the member 45, only, leaving the member 59 free to move with respect to the trunnion element 43.

A third presser member 67 is provided with a forwardly projecting toe 68 and is formed with slots 69 and 70 similar to the slots 60 and 61. As is most clearly shown in Fig. 9, the toe 68 is disposed to the left of the toe 46, and is inclined from the horizontal in a direction opposite the direction of inclination of the toe 62. The member 67 is supported and guided by the trunnion elements 43 and 44 in a manner similar to that in which the member 59 is so supported and guided. A spacer member 72 is sleeved on the trunnion element 43 and has an axially projecting hub portion 73 which penetrates the slot 69 and which has an axial dimension greater than the thickness of the member 67. A simple spacer member 74 is sleeved on the trunnion element 44 and is adapted to bear against the forward face of the member 67.

A hub piece 75 is mounted on the trunnion element 43 and is held against movement away from the abutment member 50 by a snap ring 76 and/or a set screw 77, said hub piece being formed with an externally threaded section 78 upon which is threadedly mounted a nut 79 formed with sprocket teeth 80. In the illustrated embodiment of my invention, a washer or shim 81 is interposed between the rearward face of the nut 79 and the forward face of the spacer element 72. It will be seen that rotation of the nut 79 in a clockwise direction as viewed in Fig. 9 will exert a force upon the spacer 72 tending to move said spacer toward the abutment member 50. It will likewise be seen that, because of the dimensions of the hub portions 73 and 65, that force will be transmitted to the spacer member 56, without exerting any clamping effect upon the members 67 and 59, but that the element 45 will thereby be clamped between the spacer 56 and the abutment 50 to brake the presser element 45 against movement relative to the trunnion member 43.

Similarly, a hub piece 82 is mounted on the trunnion element 44 and is held against movement away from the abutment member 53 by a snap ring 83 and/or a set screw 84. The hub piece 82 is formed with an externally threaded portion 85 upon which is threadedly mounted a nut 86; and, in the illustrated embodiment of the invention, a washer or shim 87 is interposed between the rearward face of the nut 86 and the forward face of the spacer 74. The nut 86 is provided with sprocket teeth 88; and it will be seen that, when the nut 86 is turned in a clockwise direction, as viewed in Fig. 9, it will exert upon said shim 87 a force tending to move said shim toward the abutment member 53. That force will be transmitted, through the spacers 74, 66 and 58, and through the presser members 67 and 59, to the presser member 45, whereby all three presser members will be braked against movement relative to the trunnion element 44.

The above-described assembly of presser elements and braking means therefor is mounted at the rearward end of the carriage 17. Near the forward end thereof, a pair of upstanding supports or standards 89 provide journal mountings for a pair of shafts 90 and 91 arranged with their axes substantially horizontal in a common vertical plane. A sprocket 92 is fixed to the shaft 90, and an endless chain 93 is trained around the sprockets 92 and 80. According to the preferred embodiment of my invention, a coiled spring 94 is incorporated in that end of the chain 93 which is placed in tension by rotary movement of the sprocket 92 in a direction such as to produce movement of the nut 79 toward the abutment member 50. Similarly, a sprocket 95 is fixed to the shaft 91 and an endless chain 96 is trained around the sprockets 95 and 88, a coiled spring 97 being incorporated in that run of the chain 96 which is placed in tension upon rotary movement of the sprocket 95 in a direction such as to produce movement of the nut 86 toward the abutment member 53.

Figure 3:
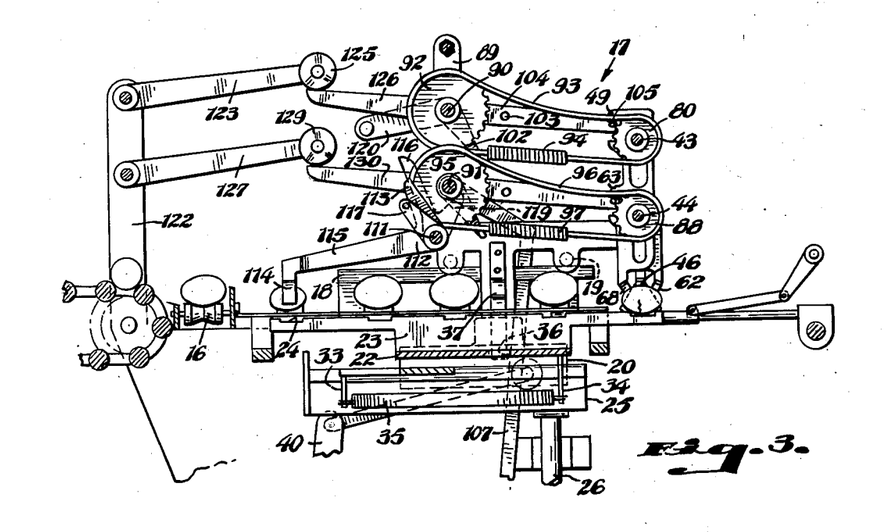
Fig. 3 is a fragmental view, taken upon a plane parallel to the plane of Fig. 2, and showing the various parts of my improved mechanism at one stage in the cycle thereof.

An arm 98 (Figs. 1 and 2) is fixed to the shaft 90 and a link 99 connects the arm 98 to be oscillated in response to movement of a lever 100 mounted for oscillation about the axis of the member 41, and suitably driven by cam means (not shown). A finger 102 (Figs. 2 and 3) is likewise fixed to the shaft 90, and is adapted, at times, to engage a pin 103 fixed to the rearwardly extending arm of a lever 104 loosely mounted for oscillation about the axis of the shaft 90. Said last-mentioned lever arm carries, at its distal end, a pin 105 cooperable, at times, with the finger 49 on the presser member 45 (Figs. 2 and 3).

An arm 106 is fixed to the shaft 91 and a link 107 connects said arm with a lever 131 (Fig. 1) similar in function and mounting to the lever 100 and actuated by a cam (not shown) to swing the arm 106 in accordance with the cycle to be described. A finger 108 is likewise secured to the shaft 91 and is engageable, at times, with a pin 109 on the rearwardly projecting arm of a lever 71, loosely mounted for oscillation about the axis of the shaft 91, and carrying a pin 110 engageable with the finger 63 of the presser member 59 and the corresponding finger of the presser member 67.

A shaft 111, mounted upon an axis parallel with the axes of the shafts 90 and 91, loosely supports a bellcrank lever 112 having one arm 113 (Fig. 3) projecting generally upwardly and carrying a yoke 114 (Figs. 3 and 8) upon its forwardly projecting arm 115. The lever 112 is disposed in registry with the line of movement of eggs through the machine; and the length and proportions of the arm 115 are such that, when the carriage 17 is in its rearmost position (Fig. 3), the yoke 114 will register with the forwardmost of the seats 12; and when the carriage 17 is in its forwardmost position (Figs. 6 and 7), the yoke 114 will register with the device 13.

Figure 5:
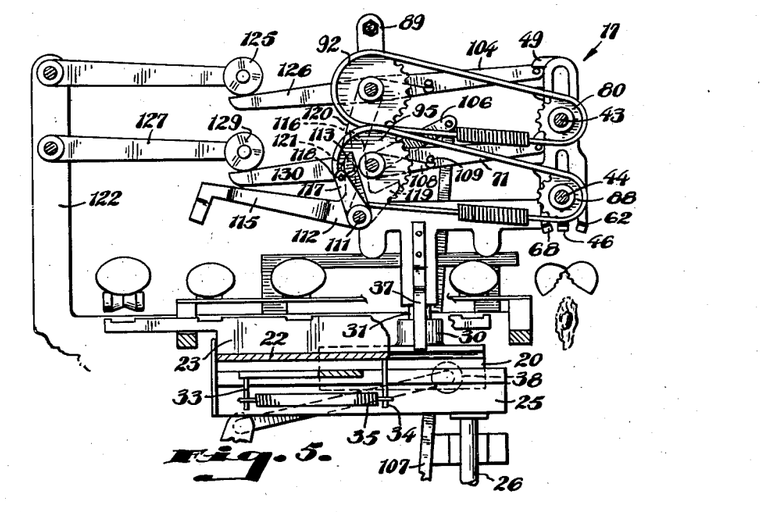

Fixed to the shaft 111 is a second bellcrank lever having arms 116 and 119 (Fig. 3); and an arm 117, having a finger 118, is likewise fixed to said shaft. The parts just described are so proportioned and designed that the finger 118 normally engages the forward face of the arm 113 whereby, because of the long projection of the arm 115, the whole assembly is gravity-urged to move in a counter-clockwise direction. An arm 120 is fixed to the shaft 90 and carries a pin or roller 121 which, at times, engages the forwardly facing surface of the lever arm 116 to swing the above-mentioned assembly in a clockwise direction. Fig. 5 illustrates the positions of the parts when the arm 120 has been so actuated. Fig. 3 illustrates the positions of the parts when the roller 121 has released the lever arm 116. In this position, lever arm 119 bears against the shaft 91 (or a collar not shown) to limit descent of the yoke 114. It will be seen, however, that no positive force can be exerted, in this assembly, tending to move the arm 115 downwardly. Consequently, when the yoke 114 encounters an unusually large egg, it is free to rest thereon in a position above that illustrated in Fig. 3, and will not exert a force upon the egg in excess of that resulting from the effect of gravity upon the arm 115.

At the extreme forward end of the machine, a pair of standards 122 support therebetween two trunnion elements 124 and 128. A lever 123 is pivotally mounted upon the element 124 and carries, at its distal end, a counterweight 125 which rests and is supported upon the forwardly projecting arm 126 of the lever 104. Similarly, a lever 127 is pivotally mounted on the element 128 and carries at its distal end a counterweight 129 which rests and is supported upon the forwardly projecting arm 130 of the lever 71.

Operation

Fig. 5 shows the parts in the relative positions which they will have assumed at the completion of the operation of opening an egg. The arm 40 is now actuated to move in a counterclockwise direction to retract the block 20 to which it is connected through the link 39. The post 26 is currently at the bottom of its stroke, the carriage 17 is supported upon rails 18, and the plate 22 with its supported rack is in its forwardmost position. As the block 20 moves from the position of Fig. 5, to the position of Fig. 6, the levers 104 and 71, with their fulcra, will be moved toward the supports 122, whereby the effect of the counterweights 125 and 129 upon those levers will be very substantially reduced. At this instant, of course, the levers are being held in the illustrated positions positively by the fingers 102 and 108.

Now, the links 99 and 107 are pulled downwardly to rotate the sprockets 92 and 95 and the shafts 90 and 91 in a clockwise direction, thereby withdrawing support of the fingers 102 and 108 from the levers 104 and 71. Because the counterweights 125 and 129 are so close to the axes of the shafts 90 and 91 as not to overbalance the effect of gravity upon the presser members 45, 59 and 67, those members will gently descend, moving freely with respect to the elements 43 and 44 because the nuts 79 and 86 are not now exerting clamping forces upon the presser elements.

At the same time, clockwise movement of the shaft 90 shifts the arm 120 in a clockwise direction to release the lever arm 116 to move in a counter-clockwise direction under the effect of gravity upon the lever arm 115; and the yoke 114 will settle upon the egg which currently is resting upon the rotating rolls 46. If that egg is not accurately oriented, the effect of the straddling arms of the yoke 114 will be to shift the rotating egg into proper alignment.

Concurrently, the post 26 is moved upwardly to the limit of its path of reciprocation, carrying with it the platform 25, the block 20, and the rack 23. The rack 23 moves upwardly between and past the rolls 16 and the elements of the seats 12, picking up the eggs from the rolls and the seats 12 and shifting them into the position illustrated in Fig. 7. The pressers settle into firm engagement with that egg which is carried on the rearmost seat of the rack 23; and, at the same time, continued rotation of the sprockets 92 and 95 seats the nuts 79 and 86 solidly against their brake assemblies to secure the three presser members against further movement relative to their supporting trunnion elements. It will be seen that the toe 46 engages the upper surface of the egg substantially in the median plane of the egg transverse to the long axis thereof, while the toes 62 and 68 engage the upper surface of the egg on opposite sides of that plane. As the post 26 moves upwardly from the position of Fig. 6 toward the position of Fig. 7, the finger 37 enters the notch 36 in the plate 22, then the stud 30 engages the depending portion of the carriage 17, and further movement of the post lifts the carriage 17 off the track 18.

Now, the lever 40 is moved in a clockwise direction to shift the block 20 toward the right; and because of the engagement of the finger 37 in the notch 36, the plate 22 is carried with the block. Thus, the rack 23 is indexed rearwardly to carry the egg which was previously supported on the roll 16 into registry with the first of the seats 12; and, as the post 26 descends to the intermediate position of Figs. 2 and 3, all of the eggs except the rearmost one will be transeferred from the rack 23 to the seats 12, leaving the device 13 open to receive another egg from the conveyor 15. The carriage 17, of course, descends with the rack 23 and, as the carriage settles upon the rails 18, the egg-opening device 14 comes into cooperative relation with the egg at the rearmost end of the rack, all as shown in Fig. 3. It will be noted that, at that time, the sprockets 92 and 95 have been turned to such an extent as to set the brake mechanisms associated with the sprockets 80 and 88, extending the springs 94 and 97 and slackening the upper runs of the chains 93 and 96. At this time, the device 14 is actuated to penetrate the egg shell at points in the lower surface of the egg substantially in the above-mentioned plane thereof.

Figure 4:
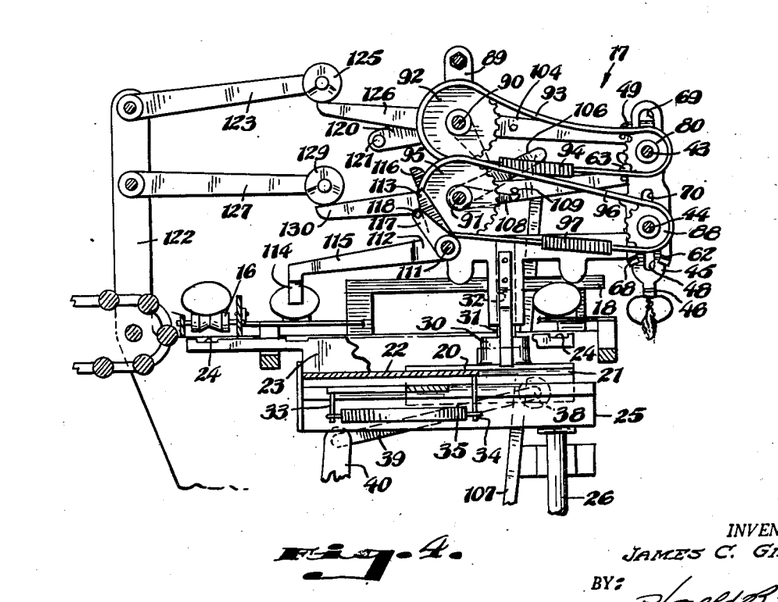
Figs. 4, 5, 6 and 7 are views similar to Fig. 3 but showing the parts in the positions which they assume in successive steps in the operative cycle of the machine.

Now, the post 26 settles farther, to the position of Fig. 4, whereby the engagement between the finger 37 and the notch 36 is destroyed, since the carriage 17 is supported upon the rails 18, and the spring 35 acts to shift the plate 22 and its rack 23 toward the forward end of the machine in readiness to lift the series of eggs for a further index cycle. At the same time, the opening device 14 is actuated to exert opposite separating forces upon the lower edges of the two ends of the egg. To facilitate this operation, the presser toe 46 must be held firmly in engagement with the upper portion of the egg, in the median plane; but the presser toes 62 and 68 must be withdrawn to permit hinging movement of the two portions of the shell. This is accomplished by actuation of the link 107 to turn the shaft 91 in a counter-clockwise direction.

As the arm 106 begins to turn, the first effect, of course, is to relax the spring 97 and tighten the upper run of the chain 96. This is accomplished in a few degrees of movement of the sprocket 95, and thereafter further rotation of the sprocket 95 backs the nut 86 away from the abutment member 53, thus releasing the braking effect of the assembly on the element 44, upon the three presser members. In this operation, of course, the nut 79 is not affected; and therefore the braking effect of the assembly on the element 43, upon the presser member 45, is not lost. Thus, the toe 46 is held in firm engagement with the associated egg. As the braking effect of the assembly on the element 44 is completely released, the finger 108 comes into engagement with the pin 109 on the lever 71; and further turning movement of the shaft 91 is accompanied by counter-clockwise movement of the shaft 71 whose pin 110 acts upon the finger 63 to lift the presser members 59 and 67 to the positions illustrated in Fig. 4.

As the opening action of the device 14 is completed, the lever 100 will be moved in a counter-clockwise direction by withdrawal of its cam actuator permitting the counterweight 101 to move the lever. Thus, the arm 98 will be turned in a counter-clockwise direction to release the brake assembly on the element 43, then to move the arm 102 into engagement with the pin 103, and so to swing the lever 104 in a counter-clockwise direction, whereby the pin 105 will lift the presser member 45. It is to be noted that, during this period, the counterweights 125 and 129 have a maximum effect upon the arms 126 and 130 of the levers 104 and 71.

During the final portion of counter-clockwise rotation of the shaft 90, the roller 121 on the arm 120 engages the forward face of the lever arm 119 to move the shaft 111 in a clockwise direction, whereby the pin 118 on the finger 117 engages the arm 113 of the lever 112 to lift the arm 115 thereof, disengaging the yoke 114 from the egg.

Now, the lever 40 is actuated to shift the block 20 to its forwardmost position, bringing the finger 37 into registry with the notch 36. Then, platform 25, moves upwardly to engage finger 37 in notch 36; and at the same time the arms 98 and 106 begin to move in a clockwise direction. Forward movement of the carriage 17 reduces the depressing effect of the counterweights 125 and 129 on the arms 126 and 130, and the levers 104 and 71 begin to turn in a clockwise direction. The device 14 discards the shell of the egg just opened; and, as the sprockets 92 and 95 continue to rotate in a clockwise direction, the parts move into the positions of Fig. 7, thus starting a new cycle.

I claim as my invention:

1. In an egg breaking machine, means for supporting an egg to be broken, means for penetrating the shell of such an egg substantially in the median plane transverse to the longitudinal axis of the egg and for exerting opposite, separating forces upon said shell at the points of penetration, and means for holding such an egg against bodily movement during operation of such shell-penetrating and force-exerting means, comprising a first presser means movable into and out of engagement with such an egg substantially in said median plane and substantially diametrically opposite such points of penetration, a second presser means movable into and out of engagement with such an egg at points oppositely spaced from said plane and on the side of said axis opposite said points of penetration, brake means cooperable with said first presser means to hold the same, at times, in engagement with an egg, lifter means cooperatively associated with said first presser means to shift the same, at times, out of such engagement, operating means for said brake means and said lifter means and connected to release said brake means before shifting said first presser means out of such engagement and to set said brake means after depositing said first presser means in such engagement and releasing the same, other brake means cooperable with said second presser means to hold the same, at times, in engagement with an egg, other lifter means cooperatively associated with said second presser means to shift the same, at times, out of such engagement, and other operating means for said other brake means and said other lifter means and connected to release said other brake means before shifting said second presser means out of such engagement and to set said other brake means after depositing said second presser means in such engagement and releasing the same.

2. In a device of the class described, a first slide mounted for substantially vertical reciprocation, a second slide mounted adjacent said first slide for substantially vertical reciprocation, guide means operatively associated with said slides to guide and limit reciprocation thereof, a first lifter means having a lost-motion driving connection with said first slide to shift the same upwardly, a first brake means carried by said guide means and cooperable with said first slide, when set, to hold said first slide against upward movement, operating means for said first brake means and for said first lifter means effective, upon actuation in one direction, to release said first brake means and thereafter to lift said first slide, and, upon actuation in the opposite direction, to disengage said first lifter means from said first slide and thereafter to set said first brake means, a second lifter means having a lost-motion driving connection with said second slide to shift the same upwardly, a second brake means carried by said guide means and cooperable with said second slide, when set, to hold said second slide against upward movement, and operating means for said second brake means and for said second lifter means effective, upon actuation in one direction, to release said second brake means and thereafter to lift said second slide, and upon actuation in the opposite direction, to disengage said second lifter means from said second slide and thereafter to set said second brake means.

3. In combination, a pair of trunnion elements mounted upon spaced, substantially horizontal axes in a common, substantially vertical plane, a first slide slotted to pass said trunnion elements and guidingly mounted thereon for substantially vertical reciprocation with respect thereto, a second slide slotted to pass said trunnion elements and guidingly mounted thereon for substantially vertical reciprocation with respect thereto, abutment means axially fixed relative to said trunnion elements and coactive with said first slide to limit movement thereof relative to said trunnion elements in one direction axially of said trunnion elements, spacer means on one of said trunnion elements, axially movable relative to such element and frictionally engageable with that face of said first slide remote from said abutment means, additional spacer means on said one trunnion element, axially movable with respect to such element, penetrating said second slide and engageable with said first-named spacer means, the axial length of said additional spacer means being greater than the corresponding dimension of said second slide whereby said additional spacer means prevents frictional engagement of said second slide, and means mounted on said one trunnion element for axial adjustment relative thereto to shift said spacer means positively axially toward said abutment means.

4. The combination of claim 3 in which said axially-adjustable means comprises a nut threadedly supported on said one trunnion element, said combination further including a rotor mounted on an axis parallel with the axis of said one trunnion element, and endless strand means providing a driving connection between said rotor and said nut.

5. The combination of claim 4 in which a portion of said strand is longitudinally elastic.

6. The combination of claim 4 in which a coiled spring constitutes a portion of that run of said endless strand means which is under tensile stress as said rotor is driven in a direction to cause said nut to move toward said abutment means.

7. In an egg-breaking machine, support means, a carriage mounted to move toward and away from said support means, egg hold-down means comprising a slide mounted on said carriage for substantially vertical reciprocation relative thereto, a lever pivotally mounted on said carriage and cooperable, at times, with said slide to lift the latter, and a counterweight supported from said support means and bearing upon said lever whereby the effect of said counterweight on said lever is varied as said carriage moves toward and away from said support means.

8. In an egg-breaking machine, support means, a carriage mounted to move toward and away from said support means, egg hold-down means comprising a slide mounted on said carriage for substantially vertical reciprocation relative thereto, a lever pivotally mounted intermediate its ends on said carriage at a point between said slide and said support means, said lever having a first arm projecting toward said slide and cooperable, at times, with said slide to lift the latter, said lever having a second arm projecting toward said support means, a second lever pivotally mounted on said support means and projecting toward said carriage, and a counterweight carried by said second lever and bearing on said second arm of said first lever, the point of engagement of said counterweight on said second arm of said first lever moving toward and away from the fulcrum of said first lever as said carriage moves toward and away from said support means.

9. In an egg-handling machine, egg-aligning means comprising a pair of diabolo-shaped rolls mounted in closely-adjacent relation upon parallel, substantially horizontal axes to receive an egg, means for driving said rolls, a carriage mounted to reciprocate on a line parallel with the axes of said rolls, a rack supported from said carriage but movable relative thereto, said rack being provided with a portion adapted to move upwardly between said rolls to pick up an egg supported on said rolls, a lever mounted on a fixed pivot on said carriage and projecting toward said rolls, a yoke carried at the distal end of said lever and adapted, at times, to straddle an egg supported on said rolls, means on said carriage and having a one-way, lost-motion lifting connection with said lever, means for driving said carriage toward and away from said rolls, and operating means for said lever-lifting means coordinated with said carriage-driving means, to release said lever when said yoke is in registry with an egg on said rolls and to drop said yoke into such straddling relation.

10. In an egg handling machine, means for supporting an egg to be broken, means for penetrating the shell of such an egg substantially in the median plane transverse to the longitudinal axis of the egg and for exerting opposite, separating forces upon said shell at the points of penetration, and means for holding such an egg against bodily movement during operation of such shell-penetrating and force-exerting means, comprising a first presser means supported for substantially vertical reciprocation and biased to move downwardly into engagement with an egg on said supporting means substantially in said median plane and substantially diametrically opposite such points of penetration, a second presser means supported for substantially vertical reciprocation and biased to move downwardly into engagement with such an egg at points oppositely spaced from said plane and on the side of said axis opposite said points of penetration, brake means cooperative only with said first presser means to hold the same, at times, in selected position, other brake means cooperative with said second presser means to hold the same, at times, in selected position, independent lifter means for said respective presser means, each having a lost-motion, one-way driving connection with its presser means, and independent actuating means for said brake means and lifter means, each actuating means acting, when moved in one direction, to release its associated brake means and thereafter shift its associated lifter means to lift its respective presser means and, when moved in the opposite direction, to release its associated presser means to move downwardly under its bias and thereafter to set its associated brake means.

11. The machine of claim 10 in which each lifter means comprises a lever loosely mounted to turn about a fixed axis and having a portion engageable, at times, with its associated presser means, a rotor mounted to turn about said axis, means connecting said rotor to actuate the associated brake means, an element moving with said rotor, and means on said lever disposed in the path of said element and engageable by said element, after a predetermined degree of movement of said rotor in a brake-releasing direction, to shift said lever in a presser-lifting direction.

12. The machine of claim 10 in which each lifter means comprises a lever loosely mounted on a shaft and having a portion engageable, at times, with its associated presser means, a rotor fixed to said shaft, means connecting said rotor to actuate the associated barke means, an arm fixed to said shaft, means for swinging said arm to turn said shaft, a finger fixed to said shaft, and abutment means on said lever disposed in the path of said finger and engageable by said finger, after a predetermined degree of movement of said rotor in a brake-releasing direction, to shift said lever in a presser lifting direction.

JAMES C. GILL.

No references cited.